US006786477B1

(12) United States Patent
Coley

(10) Patent No.: US 6,786,477 B1
(45) Date of Patent: Sep. 7, 2004

(54) ACTUATOR APPARATUS

(75) Inventor: David Coley, West Midlands (GB)

(73) Assignee: Aldridge Piling Equipment (Hire) Company Limited, Staffordshire (GB)

( * ) Notice: Subject to any disclaimer, the term of this patent is extended or adjusted under 35 U.S.C. 154(b) by 0 days.

(21) Appl. No.: 09/831,488

(22) PCT Filed: Nov. 12, 1999

(86) PCT No.: PCT/GB99/03785

§ 371 (c)(1), (2), (4) Date: Jul. 23, 2001

(87) PCT Pub. No.: WO00/29678

PCT Pub. Date: May 25, 2000

(30) Foreign Application Priority Data

Nov. 14, 1998 (GB) ............................................ 9824927

(51) Int. Cl.[7] ................................................. B23Q 3/06
(52) U.S. Cl. ........................................... 269/20; 269/32
(58) Field of Search ............................. 269/20, 27, 24, 269/32, 228, 136, 31, 93

(56) References Cited

U.S. PATENT DOCUMENTS 4,164,344 A * 8/1979 Deragne ...................... 269/27
4,371,042 A 2/1983 Kühn
4,560,152 A * 12/1985 Miller ......................... 269/24
4,650,008 A 3/1987 Simson
5,161,788 A * 11/1992 Guzzoni ...................... 269/24
6,113,086 A * 9/2000 Yonezawa .................... 269/24

FOREIGN PATENT DOCUMENTS

DE 1 957 469 3/1971
DE 24 10 385 9/1975

* cited by examiner

*Primary Examiner*—Lee D. Wilson
(74) *Attorney, Agent, or Firm*—Smith-Hill and Bedell

(57) ABSTRACT

An actuator (10) for use in installing or extracting piles and the like has a common member (12) supported at (14) and having jaws (16) for gripping a pile. Within the block (12) a double-acting piston (18) is located alongside a space (20) for a control valve arrangement which provides hydraulic fluid, in various ways described, to create vibratory or impact forces from the piston (18). The piston and the valve arrangements are both removable and replaceable by alternatives, to modify the mode of operation of the actuator (10).

25 Claims, 12 Drawing Sheets

ACTUATOR APPARATUS

BACKGROUND OF THE INVENTION

The present invention relates to actuator apparatus and in particular, but not exclusively, to hydraulic apparatus for installing or extracting pile elements and like members by vibration or impact.

The apparatus may be used with pile elements as defined in British Standard specification BS EN 996; 1996 entitled "Piling Equipment—Safety Standards". Piles and like members are driven into the ground for a variety of reasons in the construction industry and other industries. In addition to pile elements as defined in BS EN 996, other types of element are conventionally installed in a similar manner, such as steel trench sheeting, and PVC, polystyrene and glass fibre composite piles. These may be used for shoring up a trench wall, protection against erosion, etc. Devices may also be driven in a similar manner for soil compaction.

For simplicity, the single term "pile element" is used in a broader manner in this specification than in BS EN 996, in order to encompass all of these alternatives and similar items drivable into the ground. In addition, apparatus may be used to withdraw members from the ground by applying forces in the opposite direction. Again for simplicity, the term "installation" is used herein to refer to the application of forces for causing items to be forced down against resistance provided by the ground, or to penetrate the ground, "extraction" is used to refer to the application of forces for causing items to be withdrawn from the ground, and "driving" is used to refer to installation and extraction.

Various devices have been proposed for providing driving forces, by vibration, impact or the application of static forces. The nature and magnitude of forces to be used will in practice be chosen according to a number of factors, including the soil type and the nature of the pile element being driven. For instance, in loose, non-cohesive soils, vibration is often the quickest and quietest technique. Relatively high frequency vibration is generally attenuated more quickly and is therefore preferable for use near populated areas, particularly brown field sites. Other soil types are better served by impact driving, but this can cause problems from noise and shock waves. Legislation, particularly concerning health and safety, is becoming increasingly strict in respect of vibration and noise created by piling operations, and this presents a further factor influencing the choice of technique.

It is therefore conventional to build apparatus in a variety of different sizes and operating in a variety of different ways, so that an appropriate apparatus can be chosen for a particular situation. Unfortunately, problems with delay can then occur if it is found that the choice was inappropriate. Alternatively, equipment may be provided unnecessarily, so that alternatives are available on-site if required, but remain unused if not.

BRIEF SUMMARY ON THE INVENTION

The present invention seeks to obviate or mitigate these or other disadvantages of the prior art.

The invention provides actuator apparatus comprising piston means operable to create driving forces from a supply of pressurised fluid, and valve means operable to supply pressurised fluid to the piston means according to a predetermined sequence, to cause the apparatus to execute a first operation, the valve means and the piston means being housed within a common member, and the apparatus being characterised in that the valve means or the piston means or both being removable from the member for replacement by an alternative means operable within the common member to cause the apparatus to execute an alternative operation, and wherein the or each valve means comprise a valve arrangement rotatable within a housing, there being ports in the housing walls for pressurised fluid, and the valve arrangement carrying partitions which serve to change the connections between the fluid ports in accordance with the predetermined sequence as the valve arrangement rotates, and wherein the valve arrangement of the or at least one of the valve means is axially movable to change the predetermined sequence.

We have realised that an actuator according to the invention can be used to apply vibration, impact or static forces to pile elements and also to tooling such as a compaction plate, an auger or mandrel, or demolition shears or cutters. Preferably the valve means is removable for replacement with an alternative valve means operable to supply fluid according to an alternative sequence. The valve arrangement may have a first axial position at which a wider fluid path is provided to one face of the piston means than to the other, and be movable to a second axial position at which a narrower fluid path is provided to the said one face than to the other. The valve means may have a port having a width which is not constant in the axial direction of the valve arrangement, whereby the effective width of the fluid path to the piston means can be set by setting the axial position of the valve arrangement. The valve arrangement may provide drive alternatively to opposite faces of a piston of the piston means, whereby to create reciprocation.

The valve arrangement may be formed to complete a plurality of cycles of the piston means for each full turn of the valve arrangement. The valve arrangement may have a first axial position in which a first number of cycles are completed for each full turn of the valve arrangement and a second axial position in which a different number of cycles is completed for each full term. The fluid path to the piston means may be relatively narrow in the first axial position, and relatively wide in the second axial position.

The apparatus may further comprise intermediate means to which driving forces are provided by the piston means, and which convey driving forces to an item being driven. The item may be an item of tooling or a pile element. The intermediate member may provide for movement to align the tooling and may be operable hydraulically or pneumatically. The intermediate member may convey forces to clamping members by which a workpiece may be clamped. The clamping members preferably extend at an angle to the intermediate means to allow side or end clamping of a workpiece. The intermediate means is preferably elongate, and preferably extends to one side of the common member. The clamping members may extend substantially perpendicular to the intermediate means.

The intermediate means may extend through a passage within the piston means, and have one or more enlarged heads against which the piston means may act in either of two opposite directions.

Resilient members may be provided, against which the piston means acts, in use. The piston means may be isolated by the resilient members from direct impacts, whereby to create vibrating driving forces. The piston means may create impact forces when the resilient members become fully compressed.

The apparatus is preferably adapted for resilient attachment to a mounting bracket by means of which the apparatus may be supported by a conventional support arrangement. The support arrangement may be provided on a support machine, preferably operable to apply crowd forces to the apparatus and preferably able to supply pressurised fluid to the apparatus.

BRIEF DESCRIPTION OF THE DRAWINGS

Embodiments of the present invention will now be described in more detail, by way of example only, and with reference to the accompanying drawings, in which.

DETAILED DESCRIPTION OF THE INVENTION

Figure 1:
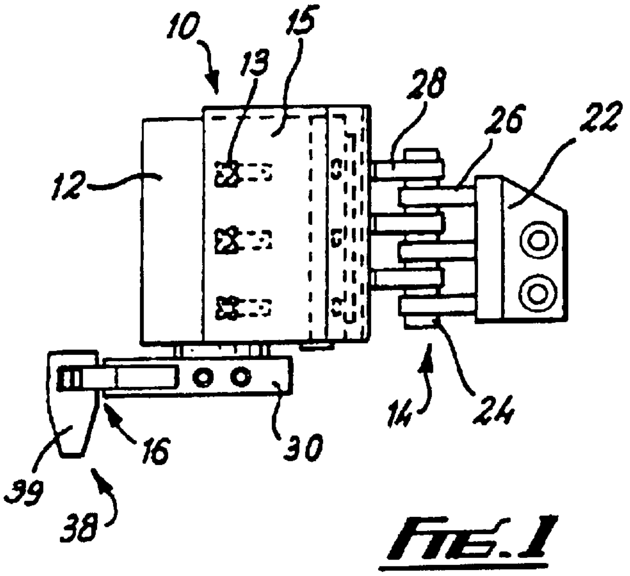
FIG. 1 is a simplified side elevation of an actuator according to the present invention.
Figure 2:
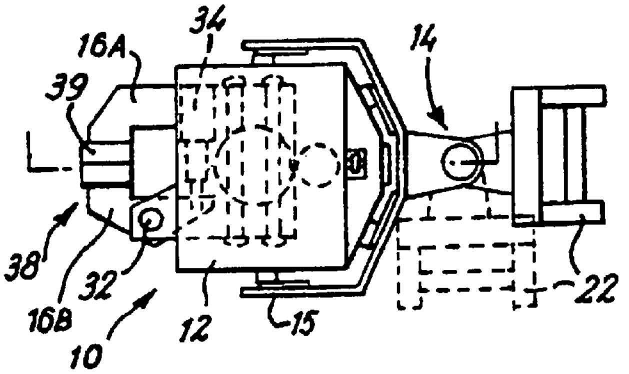
FIG. 2 is a plan view of the actuator of FIG. 1.
Figure 3:
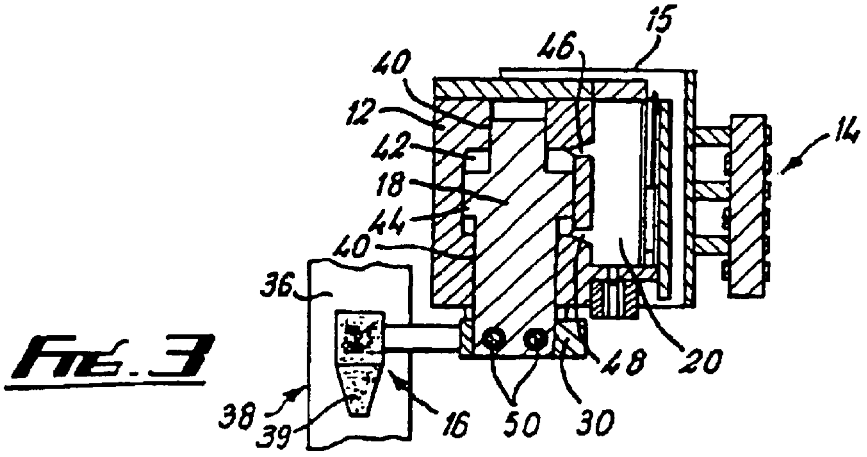
FIG. 3 is a vertical section through the actuator of FIG. 1.

Turning first to FIGS. 1 to 3, there is shown an actuator 10 for use in installing or extracting piles and the like. The actuator 10 has a common block 12 supported at 14, as will be described, and having jaws 16 for gripping a pile. Within the block 12, the actuator 10 has a double-acting piston 18 alongside which there is a space 20 for a control valve arrangement (omitted from FIG. 3 for clarity) which provides hydraulic fluid to the piston 18, during use.

The block 12 is supported at 13 by resilient mountings on a mounting bracket 15, which is in turn mounted at 14 on the second bracket 22 of an excavator or like hydraulic machine. The second bracket 22 carries a vertical hinge pin 24 by fingers 26. A second set of fingers 28 attach the bracket 15 to the pin 24, which is rotatable relative to the fingers 26, allowing the machine 10 to be turned relative to the second bracket 22, about a generally vertical axis. Alternatively, hinge arrangement can be replaced by an arrangement of a swivel pin and thrust bearings. These arrangements make use of the apparatus 10 more versatile, by allowing operation at a variety of angles and in confined spaces. The hinge arrangement could be more compact than is shown.

The second bracket 22 is preferably mounted on the arms of an excavator or like machine, preferably one which can apply a downward force ("crowd") to the machine 10 while in use, to assist in driving a pile. The presence of resilient mountings at 13 helps isolate the excavator from impact and vibration created within the machine 10.

The bottom end of the piston 18 carries a plate 30 from which the jaws 16 project. One jaw, 16A is fixed in position. The other jaw is mounted at a pivot 32 part way along its length. A clamp piston 34 is provided, acting between the free end of the jaw 16B, and the fixed jaw 16A or a fixed point on the plate 30. Consequently, pressurising the piston 34 to extend the piston arm will cause the jaw 16B to pivot at 32 and move toward the jaw 16A, to clamp a workpiece 36, generally at 38, between gripping plates 39 carried by the jaws 16. It can be seen from the drawings that the jaws 16 reach out sideways (i.e. generally horizontally and transverse to the driving direction) to reach the pile 36. The plates 39 reach down from the ends of the jaws 16, extending below any other part of the machine 10. This increases versatility of the device in allowing a pile member to be gripped from the side or from above. When gripped from the side, the whole of the plate 39 can be used, which reduces the pressure applied by the plates, while allowing adequate driving forces to be conveyed. This is particularly preferred for relatively fragile pile members such as light metal trench sheeting, wooden or concrete sections, glass fibre or PVC pile members. Side driving allows driving even if the top of the pile is beyond the reach of the excavator arms on which the apparatus is mounted. However, end driving can be achieved by locating the machine 10 above the pile member, which is gripped between the lower extremities of the plates 39.

The piston 18 shown in FIG. 3 is of generally cylindrical form, movable in a generally vertical direction in bores 40 and a central chamber 42. The piston 18 carries a shoulder 44 within the chamber 42. The diameter of the piston 18 is smaller above the shoulder 44 than below, so that the surface area of the shoulder 44 transverse to the piston axis is greater on the upper surface of the shoulder 44 than on the lower surface.

Upper and lower hydraulic ports 46, 48 communicate between the chamber 42 and the valve space 20, allowing valve arrangements (to be described) to provide hydraulic fluid to the upper or lower face of the shoulder 44, in order to drive a piston up or down.

In FIGS. 1 to 3, the piston 18 is permanently affixed to the plate 30 by means of attachment pins 50, so that reciprocating vertical movement of the piston 18 causes vibration of the plate 30, and thus allows a pile 36 to be driven by vibration.

Figure 4:
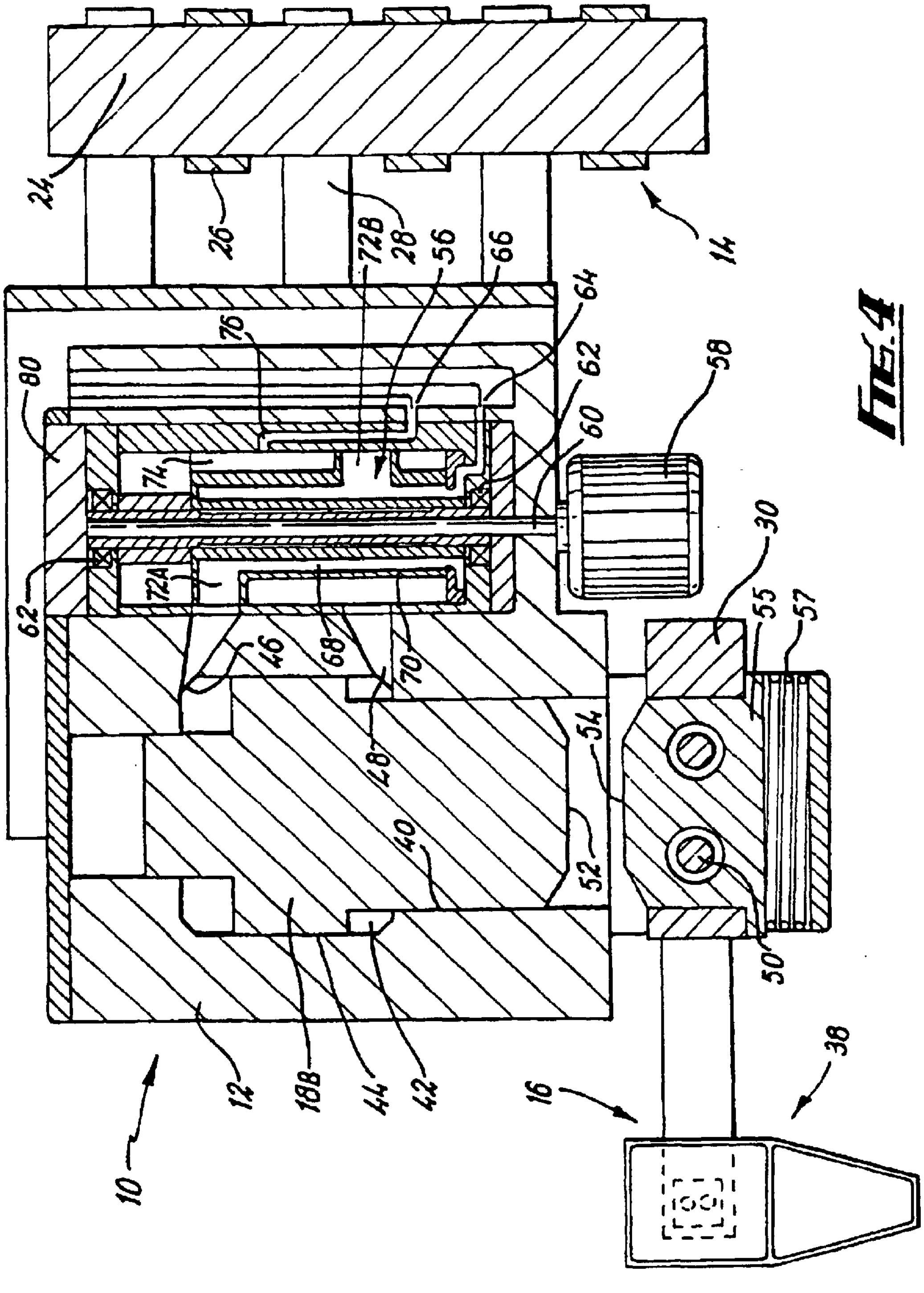
FIG. 4 is a more detailed cut-away view, on an enlarged scale.

The arrangement shown in FIG. 4 is very similar to the arrangement of FIG. 3, but shows an alternative piston 18B which is no longer permanently attached to the plate 30. Rather, the lower face 52 can move up, clear of the upper face 54 of an anvil 55 attached to the plate 30, in place of the piston, by means of the pins 30. The face 52 can also move down to strike the face 54, so that impact (or "percussive") forces are generated in this arrangement. The anvil 55 is supported from below by a compression spring arrangement 57, which serves to push the anvil 55 up into the block 12 after each strike. The spring arrangement 57 also serves to isolate the main body of the machine from shock forces.

FIG. 4 illustrates a valve arrangement 56 located in the space 20. The arrangement 56 is a rotary valve arrangement driven by a motor 58 (which may be a hydraulic motor) through a shaft 60 to which various components (including the motor) are splined. Bearings 62 are provided to support components of the arrangement 56 during rotation. Splines connect the various rotating components and also allow axial movement, for reasons to be explained below. It will become apparent that at least in some examples, particularly those in which axial movement is not required, splined connections may not be required.

The valve arrangement 56 is in the form of a removable cartridge, and has an inlet 64 for pressurised hydraulic fluid, and a exhaust outlet 66. The inlet 64 communicates with an inner space 68 around the shaft 60 and bounded at its outer extremity by partitions 70. However, two outlets 72 are provided from the inner space 68. The upper outlet 72A is in communication with the upper port 46 when the arrangement 56 is in the rotary position as shown in FIG. 4. The lower outlet 72B is closed by the walls of the valve arrangement. Thus, in this position, hydraulic pressure is being supplied to the upper face of the shoulder 44, driving the piston 18 downwardly. However, it can readily be seen from FIG. 4 that after the valve arrangement 56 has turned through 180° about the shaft 60, the upper outlet 72A will have moved clear of the upper port 46, and the lower outlet 72B will have come into communication with the lower port 48. In this position, hydraulic pressure passes to the lower face of the shoulder 44, driving the piston 18 upwardly, for the return stroke. It can be appreciated that with the surface area of the upper face of the shoulder 44 being greater than the surface area of the lower face, the piston 18 is driven downwardly with greater force than it is returned upwardly.

The valve arrangement 56 also provides a return path for hydraulic fluid to exhaust at 66. An outer space 74 extends around the partition 70 and communicates at 76 with the exhaust bore 66. The exhaust port 76 will not communicate with the pressure source 64 or outlets 72 at any angular position of the valve arrangement. Thus, in the position shown in FIG. 4, the lower port 48 is connected through the outer space 74 to the exhaust 66. After the arrangement 56 turns through 180°, the upper port 46 will be in communication with the outer space 74, allowing hydraulic fluid to pass around the partition 70, to reach the exhaust 66. Thus, by applying hydraulic pressure to the inlet 64 and allowing exhausting through the exhaust 66, while turning the valve arrangement 56, the piston 18 is reciprocated by alternately applying pressure above and below the shoulder 44, while exhausting the other face of the shoulder 44.

The valve arrangement shown in FIG. 4 represents a relatively simple operating sequence, appropriate for simple impact installation of a pile member clamped in the jaws 16, but not for extraction. However, an extraction arrangement can be formed by replacing the piston with one having a larger lower face and smaller upper face, and by attaching the piston to the plate 30 in place of the anvil 55, in the manner of FIGS. 1 to 3. In other circumstances, alternative operating sequences may be required. In particular, the operating sequence may require to be different if impact is used rather than vibration, or according to the nature of the pile element being driven or the ground into which it is being installed or from which it is being extracted. For all of these reasons, and in accordance with the invention, the valve arrangement 56 is replaceable in the piling machine 10, by removal of a closure plate 80, so that the valve arrangement 56 can be withdrawn as a single unit, sliding up the splined motor shaft 60. A replacement cartridge containing an alternative valve arrangement 56 can then be placed into the space 20, to change the operating sequence of the machine 10, as will now be described with particular reference to FIGS. 5 to 8, which show alternative valve arrangements in isolation.

In each of FIGS. 5 to 8, there is shown a vertical section through the valve arrangement, corresponding to the view in FIG. 4, together with inset views of sections at various positions. In each case, the horizontal section is labelled with a suffix corresponding to the section line in the main drawing so that, for instance, FIG. 5B is a horizontal section at the line B—B in FIG. 5. In addition, it must be understood that the section views are sections "at" the corresponding height, not "from" the corresponding height, so that only those components present at the section plane are shown in the section drawing.

Figure 5:
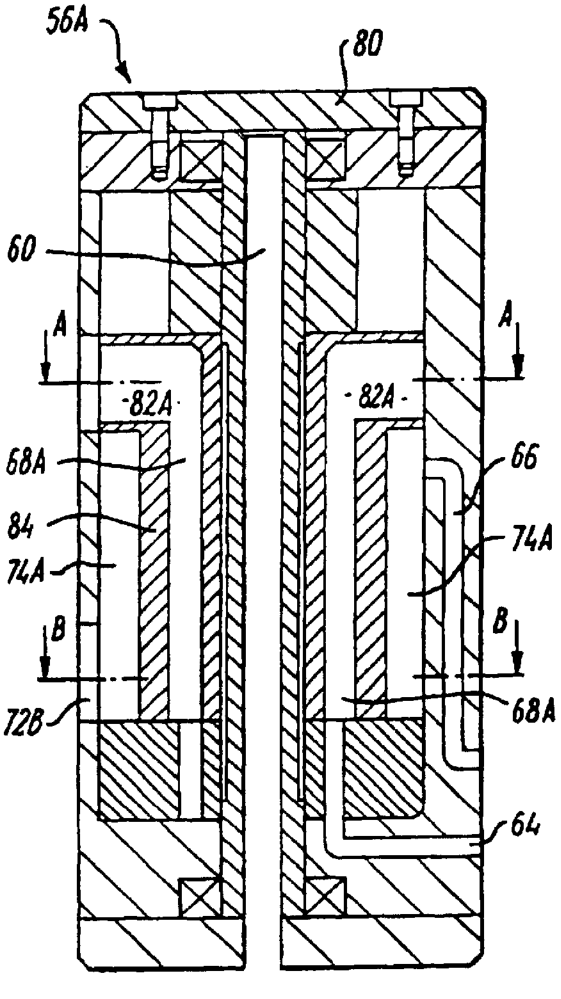
FIGS. 5 to 8 are sections through alternative valve arrangements.
Figure 5A:
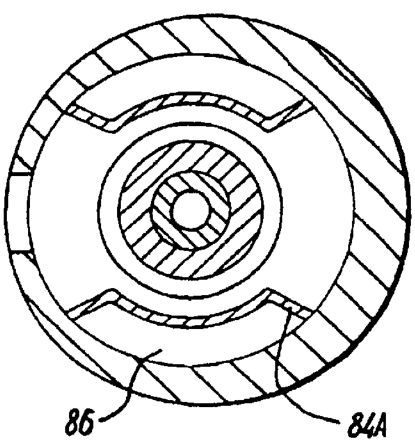
Figure 5B:
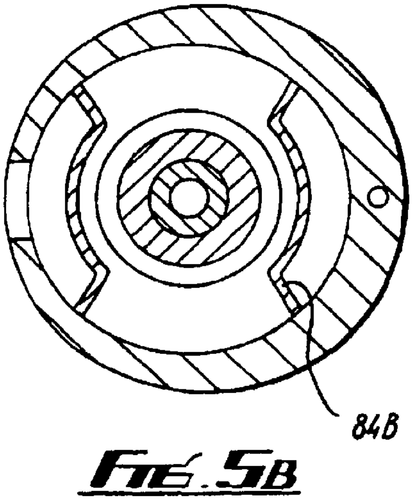

The arrangement 56A in FIG. 5 differs from that in FIG. 4 principally in that two cycles of the piston 18 are produced for each complete revolution of the valve 56A. This is achieved by providing two upper outlets 82A from the inner space 68A, at 180° from each other. Partitions 84A separate the upper outlets 82A from upper extensions 86 of the outer space 74A. Similar partitions 84B are provided at the height of the lower outlet 72B, so that in the condition shown, the outer space 74A communicates with the port 72B to connect this with the vent 66, while the upper outlet 82A is coupled through the inner space 68A to the inlet 64. This provides the down stroke of the piston 18.

As the valve arrangement turns through 90°, including the partitions 84A, 84B, the inner space 68A and positive hydraulic pressure comes in communication with the lower port 82B between the partitions 84B, whereas the outer space 86 around the partitions 84A comes into communication with the upper port 72A, so that the return stroke commences, with hydraulic pressure being supplied under the piston 18. After a second 90° turn of the valve arrangement, the arrangement reverses again, creating a second down stroke. Consequently, this valve arrangement creates an operating frequency which is twice the frequency of the arrangement of FIG. 4 (at a given motor speed).

Figure 6:
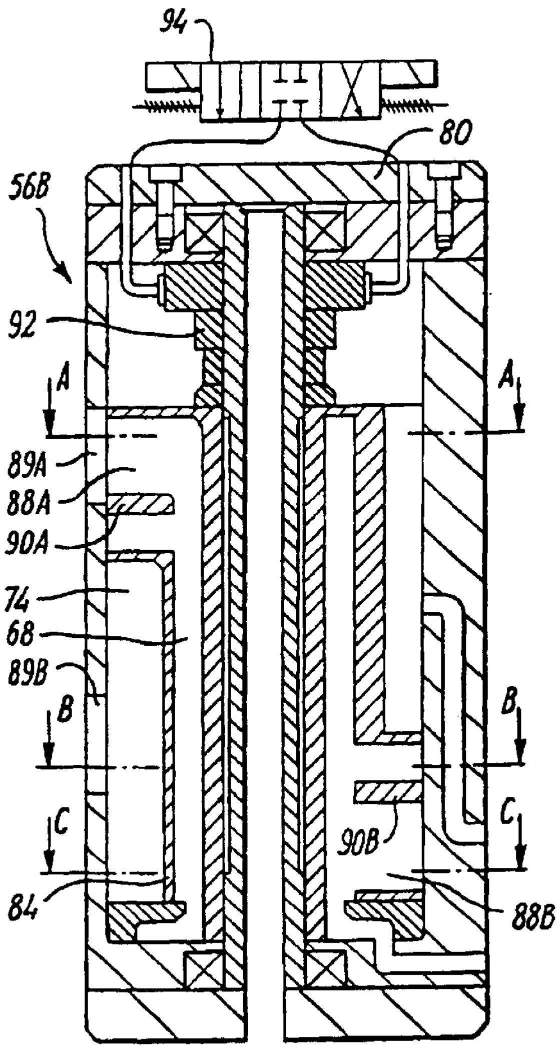
Figure 6A:
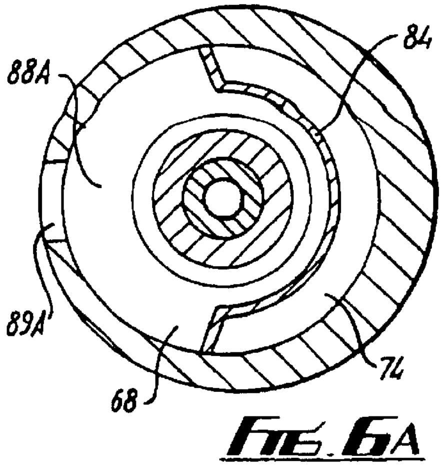
Figure 6B:
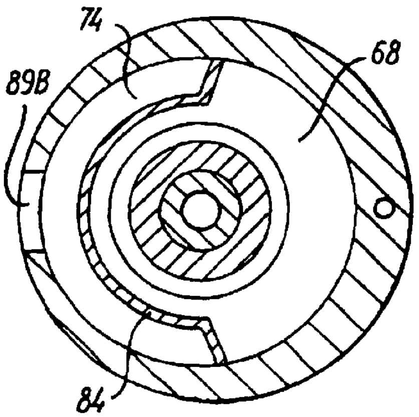
Figure 6C:
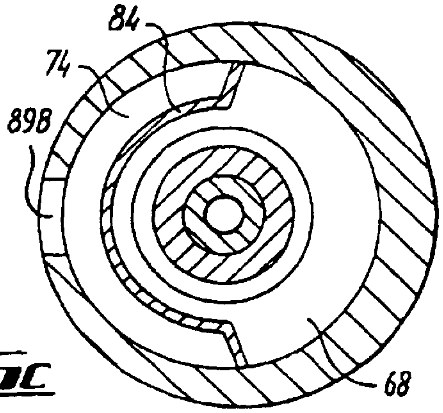

FIG. 6 shows a more complex arrangement in which the partition elements within the valve arrangement are axially movable, with the sequence performed by the valve being changed according to the axial position, as follows.

The arrangement 56B has some similarities to the arrangement 56 (FIG. 4) in that each full turn of the arrangement 56B produces one complete cycle of the piston 18. However, the axial position of the arrangement 56B allows the cycle to use either a wide supply to the port 46 and a narrow supply to the port 48 (for a powerful down stroke and a relatively weak up stroke, such as for installing pile members), or a wide supply to the port 48 and a relatively narrow supply to the port 46 (for a strong up stroke and a relatively weak down stroke, such as for use in extraction of pile members). These alternatives are achieved with replacing the piston, as follows.

The upper outlet 88A is divided at a horizontal plane by a divider 90A, leaving a relatively wide mouth above the divider 90A, and a relatively narrow mouth below. In the axial position shown in FIG. 6, it is the relatively wide mouth above the divider 90A which comes into communication with the outlet port 89A on each revolution. However, if the arrangement 56B is moved up to bring the divider 90A to the top of the outlet 88A, it will then be the relatively narrow mouth below the divider 90A which comes into communication with the outlet port 89A.

In similar manner, the lower outlet 88B is horizontally divided by a divider 90B, with a relatively wide mouth below the divider 90B, and a relatively narrow mouth above. In the axial position shown in FIG. 6, it is the relatively narrow mouth above the divider 90B which comes into communication with the outlet port 89B, but if the arrangement 56B is moved up to bring the divider 90B to the top of the port 89B, the wide mouth below the divider 90B will then come into communication with the port 89B on each revolution.

By virtue of this arrangement, the sequence of the piston 18 can be "reversed", either to provide strong downward forces for installation, or strong upward forces for extraction.

The axial position of the arrangement 56B is set by a vertical drive arrangement 92 controlled through a valve 94 which allows the arrangement 56B to be driven upwardly, downwardly or locked in position.

Figure 7:
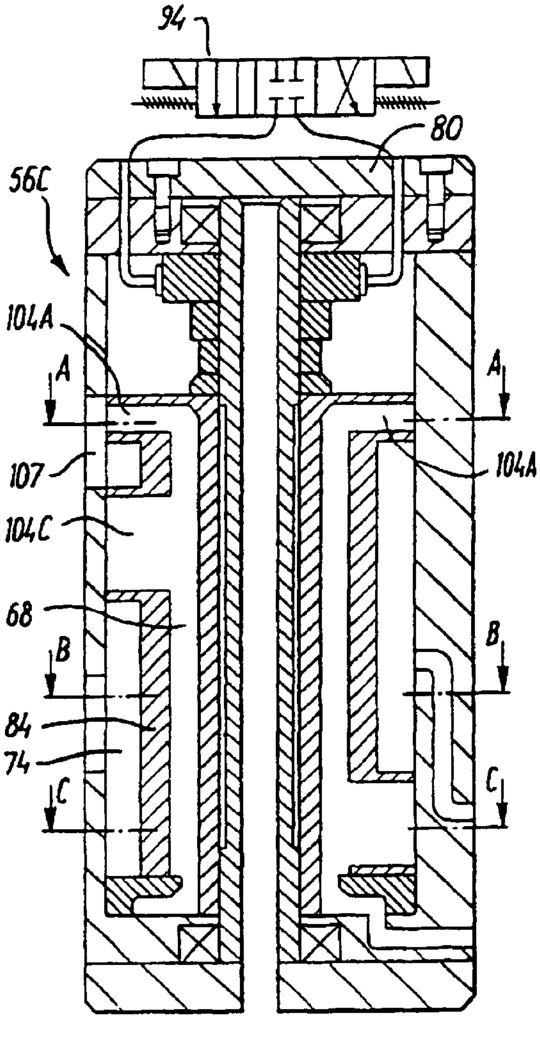
Figure 7A:
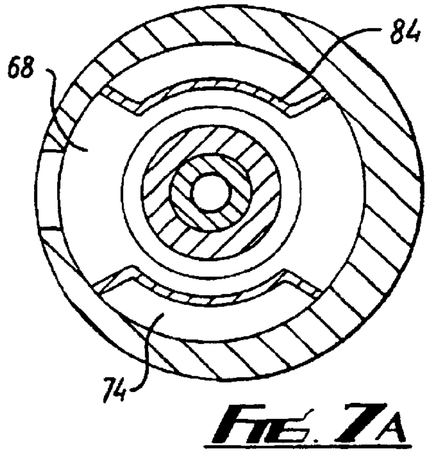
Figure 7B:
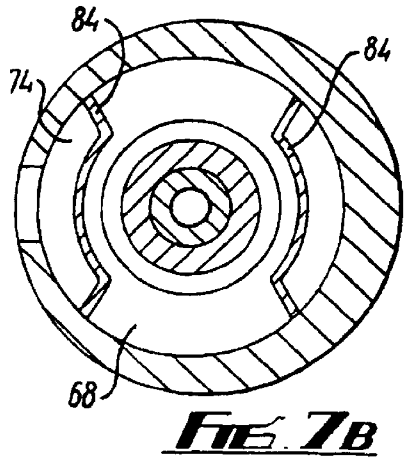

FIG. 7 shows a further alternative valve arrangement 56C. In this arrangement, the axial position can be selected to choose between either a high frequency, low amplitude oscillation or a low frequency, high amplitude oscillation. During pile driving, low frequency may be preferred for its effectiveness, but gives rise to vibrations which travel further than higher frequencies. Higher frequencies are less problematic from this point of view, but generally less effective for driving. An advantage of the arrangement 56C is that high or low frequency can readily be chosen according to the operating conditions, simply by changing the axial position, as follows.

The arrangement of FIG. 7 has some similarities with FIG. 5, in that two upper outlets 104A are provided at diametrically opposite positions, to produce two down strokes for each rotation of the arrangement 56C. The upper outlets 104A are relatively narrow. Consequently, the sequence of the piston 18 is relatively high frequency, but low in amplitude.

Figure 8:
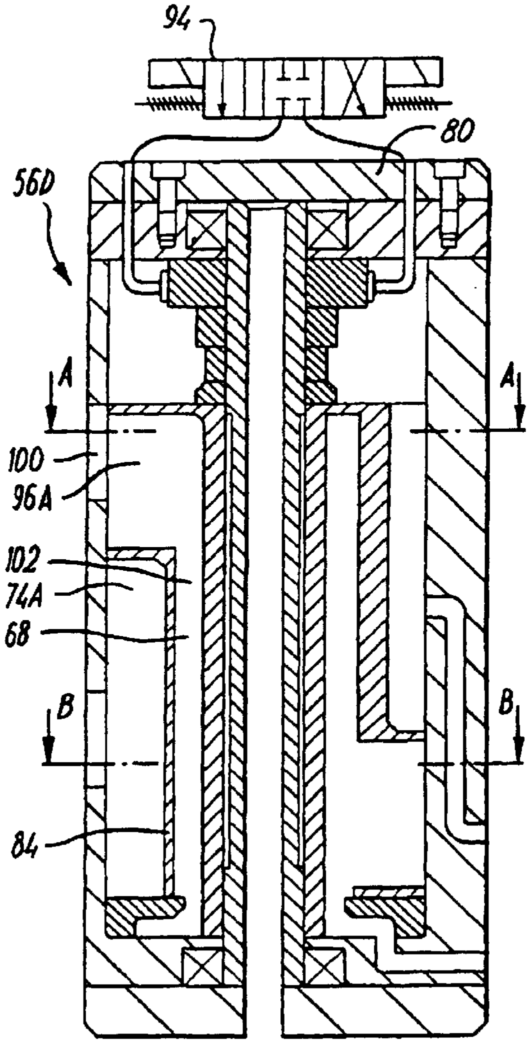
Figure 8A:
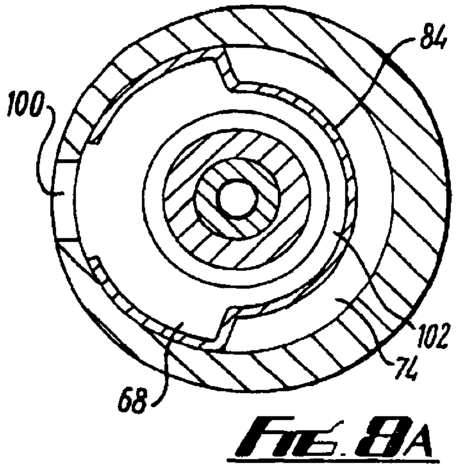
Figure 8B:
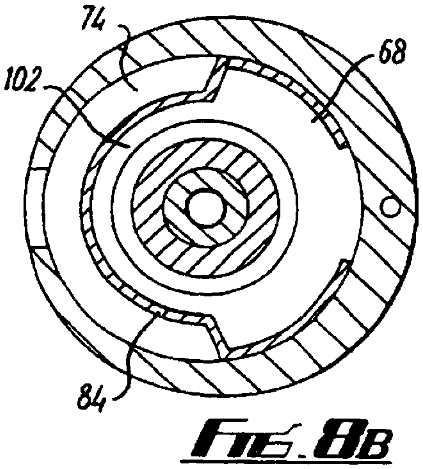
Figure 8C:
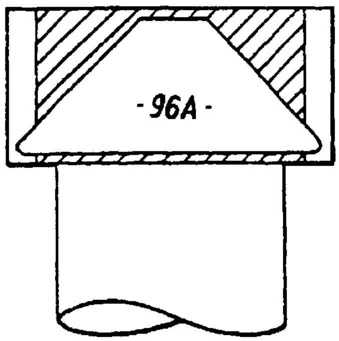

One of the upper outlets 104A (the left hand outlet as shown in FIG. 8) is separated from a wider outlet 104C by a divider 106. The arrangement 56C can be raised from the position shown until the outlet 104C is at the appropriate height to come into communication with the port 107 on each revolution of the arrangement. That has the effect of halving the frequency of the sequence, but the relatively wide outlet 104C creates relatively high amplitude movement of the piston 18.

Figure 7C:
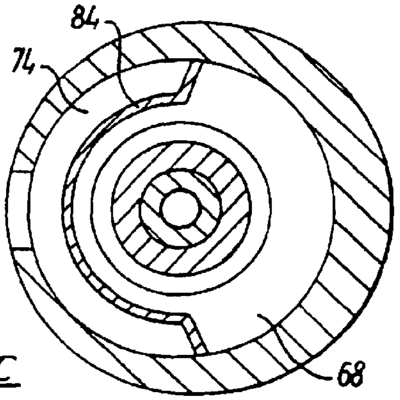

FIG. 8 shows a further alternative valve arrangement 56D in which the axial position is again relevant. Again, the arrangement 56D is broadly similar to the arrangement shown in FIG. 4, in that one cycle of the piston 18 is created by each full turn of the valve arrangement 56D. However, the upper outlet 96A is significantly different to the corresponding parts previously described, as can be seen from FIG. 7C. The circumferential width of the outlet 96A reduces with increasing height up the axis of the arrangement 56D. The outlet 96A is broadly triangular. The axial length of the outlet 96A is greater than the axial length of the port 100 in the wall. Consequently, the total area through which the inner space 102 can communicate with the port 100 will depend on the vertical position of the triangular outlet 96A. As the arrangement 56D moves axially upwardly, the area increases, which reduces the restriction on hydraulic fluid and thus allows a greater volume of hydraulic fluid to pass within the time allowed by the turning of the arrangement 56D. In consequence, a higher axial position corresponds with a larger amplitude of piston movement, and this amplitude is continuously adjustable by setting the axial position of the arrangement 56D.

It can readily be understood that the various valve arrangements shown in FIGS. 4 to 8 are interchangeable thus giving the apparatus a modular format and allowing apparatus to be readily adapted for different operating requirements.

Figure 9:
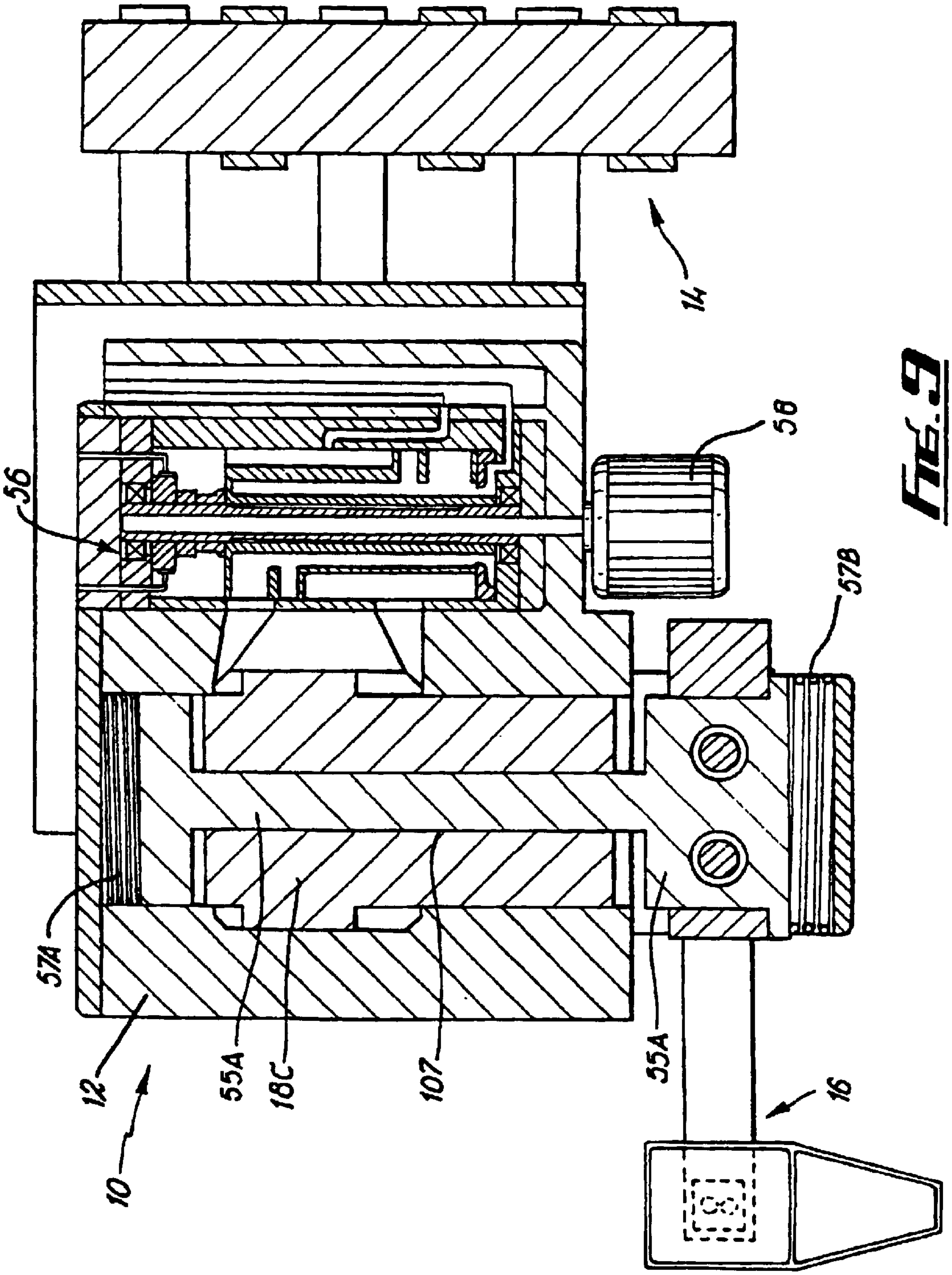
FIG. 9 is a view corresponding with FIG. 4 and showing an alternative piston arrangement.

FIG. 9 shows a modification relating to the piston. The piston 18C of FIG. 9 has a hollow bore 107 through which the anvil 55A extends, having enlarged heads above and below the piston 18C. Return springs 57A, 57B bear on the anvil 55A from above and below. Consequently, and depending on the nature of the valve cartridge being used, the piston member 18C can be driven to impact on the upper head or on the lower head. Impact on both heads is not desirable. It is particularly preferred to use the valve arrangement illustrated in FIG. 6, which provides asymmetric fluid supply so that the unit will operate either for installation or extraction. In the condition shown, with the piston 12C free to slide relative to the anvil 55A, the operation is by impact, but an arrangement could be provided to lock the piston 18C to the anvil 55A to produce operation by vibration.

Figure 10:
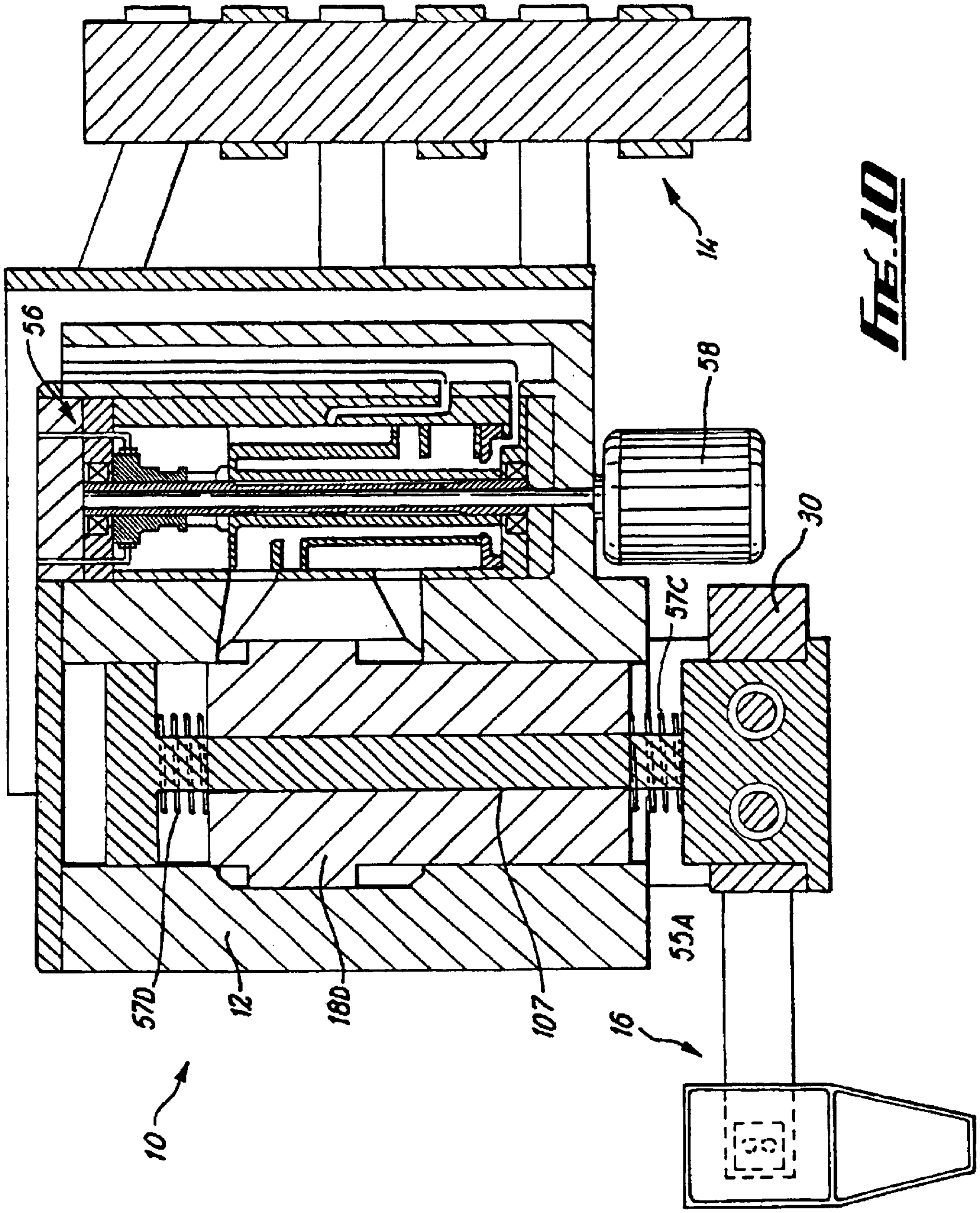
FIG. 10 is a view corresponding with FIG. 4 and showing a further alternative piston arrangement.

FIG. 10 shows a further modification, again relating to the piston. In other respects, the version of FIG. 10 is equivalent to the version of FIG. 9. In FIG. 10, the piston 18D again has a hollow bore 107 through which the anvil 55A extends, the anvil having enlarged heads above and below the piston 18D. Springs 57C, 57D are provided in the form of coil compression springs located around the shaft of the anvil 55A, bearing between the anvil heads and the piston 18D. Consequently, and depending upon the nature of the valve cartridge being used, the piston member 18D can be driven toward the upper head or the lower head of the anvil 55A, which will cause the springs 57C, 57D to become compressed. Oscillation of the piston 18D will therefore cause vibration of the anvil 55A, resulting in vibratory driving forces. However, if resistance is met, such as unusually hard ground, the piston 18D may fully compress one or other of the springs 57C, 57D, resulting in an impact between the piston 18D and one or other anvil head. This causes impact forces to be created and conveyed to the workpiece. This arrangement can be used to drive and extract pile elements, by use of an appropriate valve cartridge.

Figure 11:
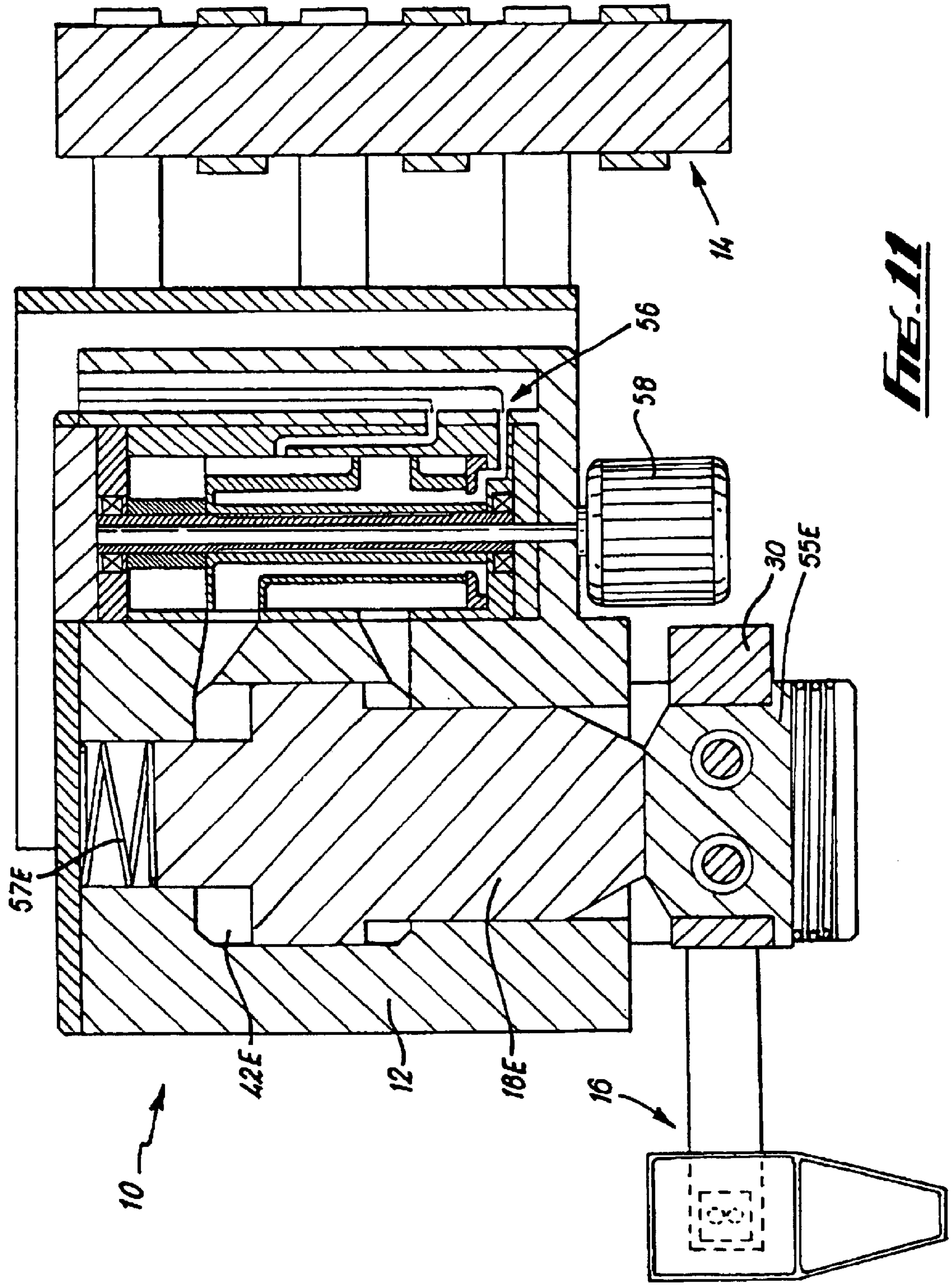
FIG. 11 is a view corresponding with FIG. 4 and showing a still further piston arrangement.

FIG. 11 shows a further modification, which makes use of the valve cartridge of FIG. 4. This modification can make use of a solid piston 18E, as shown, similar to the piston of FIG. 4, or a piston with a hollow bore, similar to the piston 18C, 18D of FIGS. 9 and 10. In this example, a powerful spring 57E acts between the piston 18E and the top wall of the piston chamber 42E. The spring 57E is a compression spring acting to push the piston 18E down toward the anvil 55E. Using an adequately strong spring 57E, the piston 18E will be kept in contact with the anvil 55E during normal use, so that reciprocation of the piston 18E relative to the block 12 will cause vibration of the anvil 55E and thus of the item gripped by the jaws 16 or otherwise attached (see below). However, if the spring force is overcome, particularly in adverse conditions, the piston 18E may be moved clear of the anvil 55E, so that on the downward stroke of the piston 18E, there will be an impact between the piston 18E and the anvil 55E, the force of the impact being equal to the sum of the force provided by the hydraulic supply to the chamber 42E, and the return force of the spring 57A An arrangement of the nature of FIG. 11 is capable only of creating downward forces for installation, not for extraction.

Figure 12:
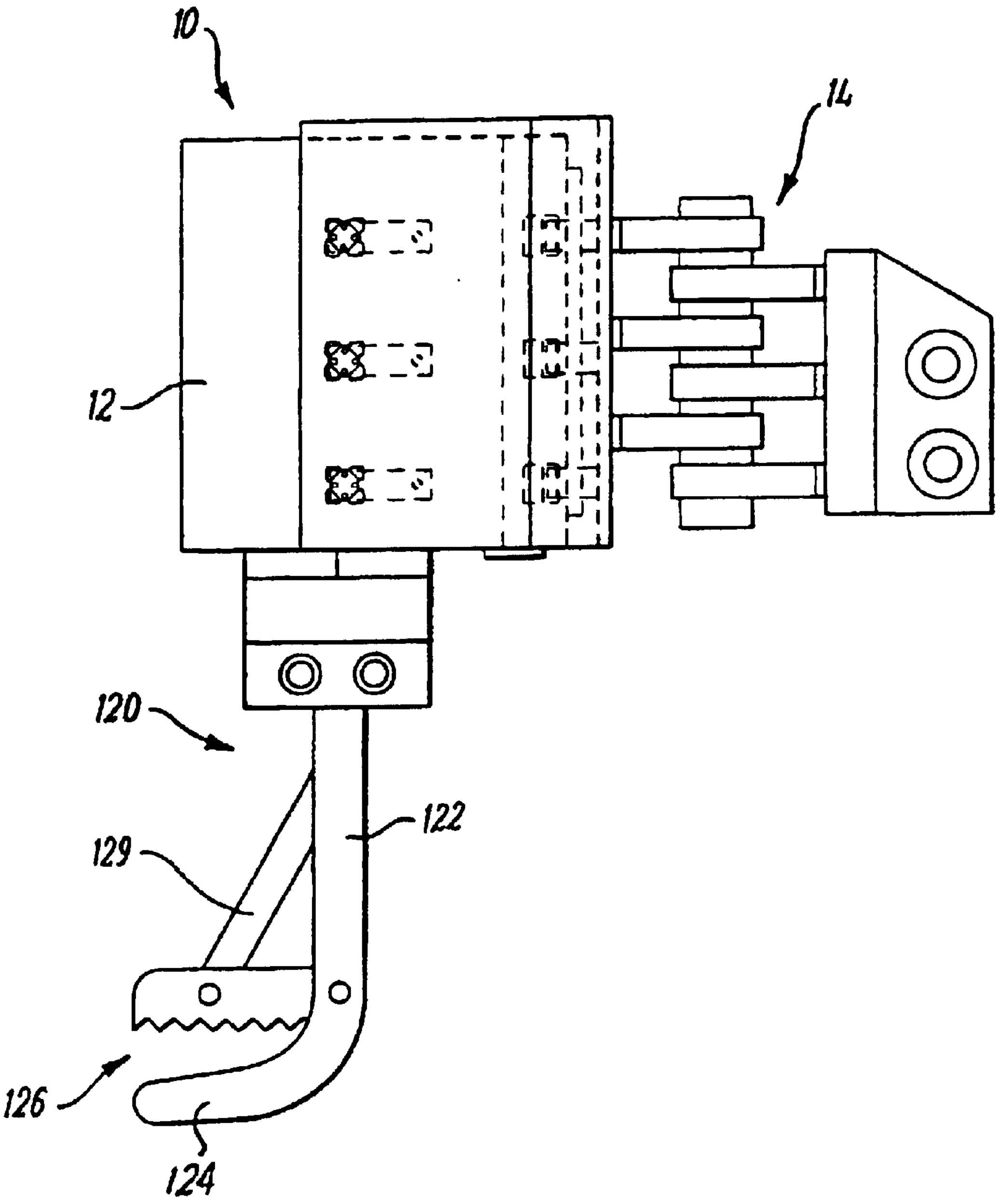
FIGS. 12 to 14 are simple elevations of the actuator of FIGS. 1 to 3 being used with various types of tooling arrangement according to the invention.

The remaining drawings illustrate the use of an actuator according to the present invention with various types of tooling. In FIG. 12, the actuator 10 of FIGS. 1 to 3 is permanently attached to a pulveriser device 120 by replacement of the plate 30. The pulveriser 120 has a leg 122 extending downwardly from the actuator 10 and turning sideways to form a lower jaw 124 of a pulveriser mouth 126. The upper jaw 128 is preferably serrated. A hydraulic cylinder 129 acts between the upper jaw 128 and the leg 122 to open and close the mouth 126. The effectiveness of the jaws is further enhanced by the vibratory or impact forces created by the actuator 10 (according to the nature of the piston and valve cartridge in use).

Figure 13:
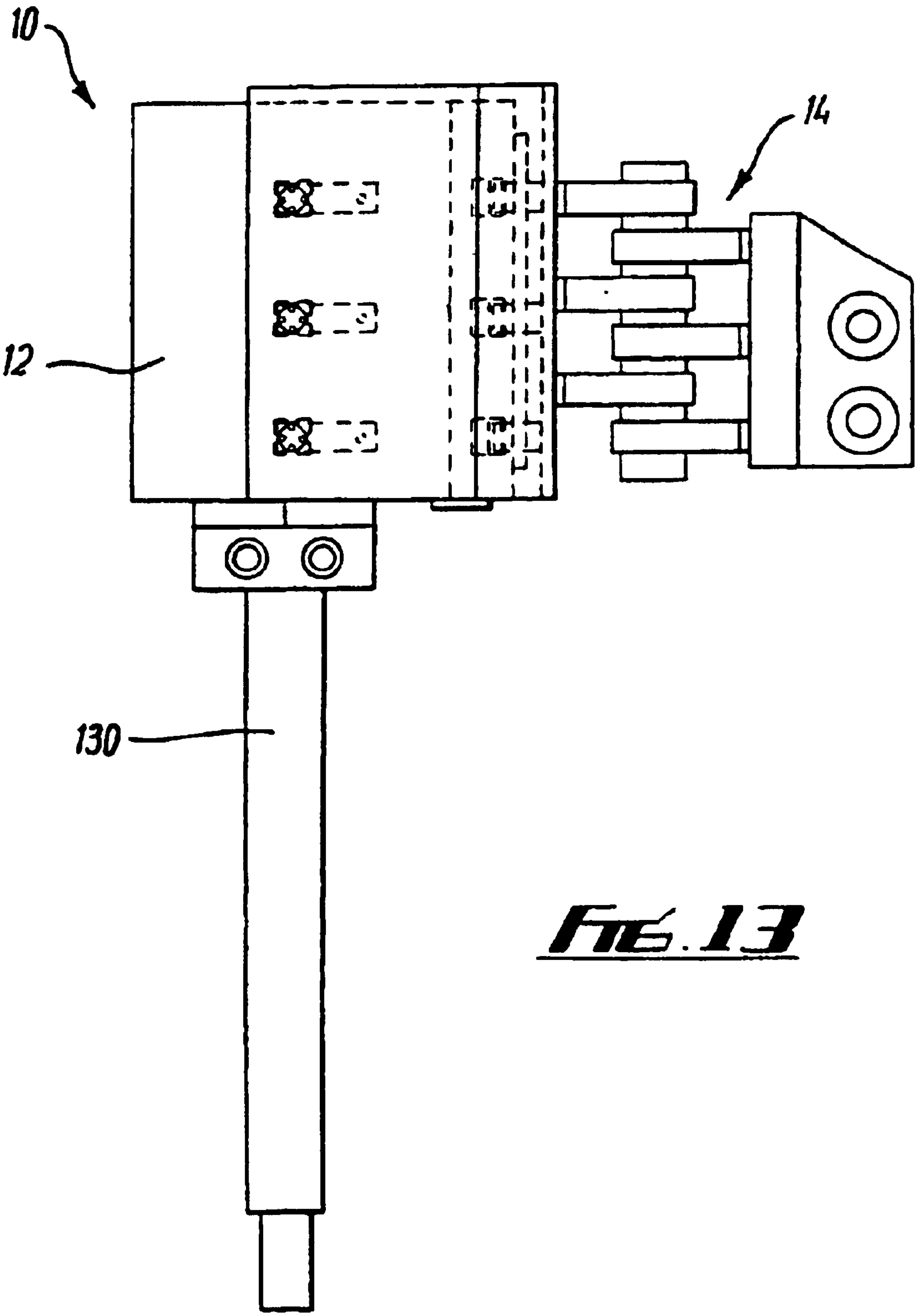

FIG. 13 shows the pulveriser 120 replaced by an elongate, downwardly extending mandrel attachment 130 by which vibratory or impact forces created by the actuator 10 can be conveyed down a bore formed in the ground, for instance.

Figure 14:
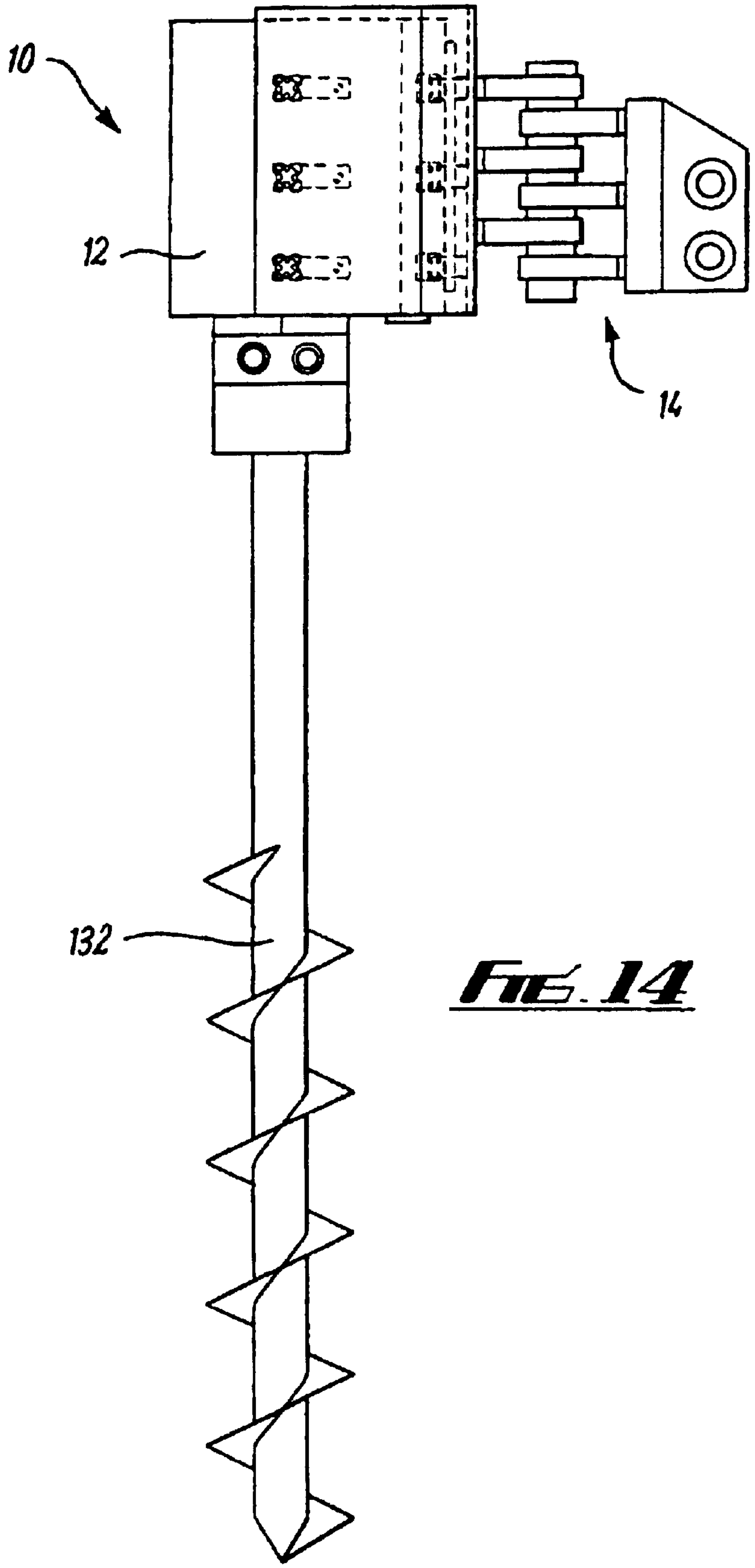

FIG. 14 shows the actuator 10 in use with an auger 132 to which the actuator 10 applies vibratory or impact forces to improve the effectiveness of the auger. An arrangement (now shown) may be provided to allow the auger 132 to be turned while being driven by the actuator 10.

It will be apparent that many variations and modifications can be made to the apparatus as described above without departing from the scope of the present invention. In particular, many features can be used interchangeably in combinations other than those described, which is a particular benefit of the invention. The block member could be assembled from more than one part. Many other piston operation sequences could be devised by appropriate modification of valve arrangements, so that operation of a machine can be modified at will by the simple expedient of appropriate modification to the valve assembly, thus retaining the machine flexible in its application.

What is claimed is:

1. An actuator apparatus comprising:

a housing member having walls formed with ports for a pressurized fluid, a first means housed in the housing member, the first means being a piston means displaceable in the housing member, a second means housed in the housing member, the second means being a valve means comprising at least one valve arrangement, the valve arrangement or each valve arrangement being transiently coupled to the piston means and the ports of the housing member, the or each valve arrangement including partitions, wherein at least one of the first and second means is removable or replaceable from the housing member to provide alternative combinations for the actuator apparatus, the or each valve arrangement being operable to supply the pressurized fluid to the piston means whereby the piston means creates driving forces, alternative combinations for the actuator apparatus in use respectively execute a first operation and a second operation, the or each valve arrangement in a first position being rotatable within the housing member whereby the partitions alter coupling connection between the ports of the housing member and the piston means in a predetermined sequence, and at least one valve arrangement being axially movable to a second position wherein the partitions differently alter the coupling connection between the ports of the housing member and the piston means.

2. An apparatus according to claim 1, wherein the second means is removable for replacement with an alternative valve means that comprises at least one additional valve arrangement, the additional valve arrangement or each additional valve arrangement being transiently coupled to the piston means and the ports of the housing member, the or each additional valve arrangement including partitions, the or each additional valve arrangement being operable to supply the pressurized fluid to the piston means whereby the piston means creates driving forces, the or each additional valve arrangement in a first position being rotatable within the housing member whereby the partitions alter coupling connection between the ports of the housing member and the piston means in a sequence that is different from said predetermined sequence, and at least one of said additional valve arrangements being axially movable to a second position wherein the partitions differently alter the coupling connection between the ports of the housing member and the piston means.

3. An apparatus according to claim 1, further comprising an intermediate means to which driving forces are provided by the piston means, and which convey driving forces to an item being driven.

4. An apparatus according to claim 3, wherein the item is an item of tooling or a pile element.

5. An apparatus according to claim 3, wherein the intermediate means provides for movement to align the tooling.

6. An apparatus according to claim 5, wherein the alignment movement is provided hydraulically or pneumatically.

7. An apparatus according to claim 3, wherein the intermediate means conveys forces to clamping members by which a workpiece is clamped, in use.

8. An apparatus according to claim 3, wherein the clamping members extend at an angle to the intermediate means to allow side or end clamping of a workpiece.

9. An apparatus according to claim 8, wherein the clamping members extend substantially perpendicular to the intermediate means.

10. An apparatus according to claim 3, wherein the intermediate means is elongate.

11. An apparatus according to claim 10, wherein the intermediate means extends to one side of the housing member.

12. An apparatus according to claim 3, wherein the intermediate means extend through a passage within the piston means, and has enlarged heads against which the piston means may act in either of two opposite directions.

13. An apparatus according to claim 1, comprising resilient members against which the piston means acts, in use.

14. An apparatus according to claim 13, wherein the piston means is isolated by the resilient members from direct impacts, whereby to create vibratory driving forces.

15. An apparatus according to claim 13, wherein the piston means creates impact forces when the resilient members are fully compressed.

16. An apparatus according to claim 1, wherein the apparatus is adapted for resilient attachment to a mounting arrangement by means of which he apparatus may be supported by a conventional support arrangement.

17. An apparatus according to claim 16, wherein the support arrangement is operable to apply crowd forces to the apparatus.

18. An apparatus according to claim 16, wherein the support arrangement is able o supply pressurized fluid to the apparatus.

19. An actuator apparatus comprising:

a housing member having walls formed with ports for a pressurized fluid, a first means housed in the housing member, the first means being a piston means displaceable in the housing member, a second means housed in the housing member, the second means comprising a valve arrangement, the valve arrangement being transiently coupled to the piston means and the ports of the housing member and including partitions, wherein at least one of the first and second means is removable or replaceable from the housing member to provide alternative combinations for the actuator apparatus, the valve arrangement being operable to supply the pressurized fluid to the piston means whereby the piston means creates driving forces, alternative combinations for the actuator apparatus in use respectively execute a first operation and a second operation, the valve arrangement in a first position being rotatable within the housing member whereby the partitions alter coupling connection between the ports of the housing member and the piston means in a predetermined sequence, and the valve arrangement being axially movable to a second position wherein the partitions differently alter the coupling connection between the ports of the housing member and the piston means.

20. An apparatus according to claim 19, wherein the piston means has first and second faces and the valve arrangement has a first axial position which a wider fluid path is provided to the first face of the piston means than to the second face, and is movable to a second axial position at which a narrower fluid path is provide to said first face than to the second face.

21. An apparatus according to claim 19, wherein the valve means has a port having a width which is not constant in the axial direction of the valve arrangement, whereby the effective width of the fluid path to the piston means can be set by setting the axial position of the valve arrangement.

22. An apparatus according to claim 19, wherein the piston means has two opposite faces and the valve arrangement provides drive alternatively to the opposite faces of the piston means, whereby to create reciprocation.

23. An apparatus according to claim 19, wherein the valve arrangement is formed to complete a plurality of cycles of the piston means for each full turn of the valve arrangement.

24. An apparatus according to claim 23, wherein the valve arrangement has a first axial position in which a first number of cycles are completed for each full turn of the valve arrangement and a second axial position in which a different number of cycles is completed for each full turn of the valve arrangement.

25. An apparatus according to claim 24, wherein the fluid path to the piston means is relatively narrow in the first axial position, and relatively wide in the second axial position.

* * * * *